UNITED STATES PATENT OFFICE.

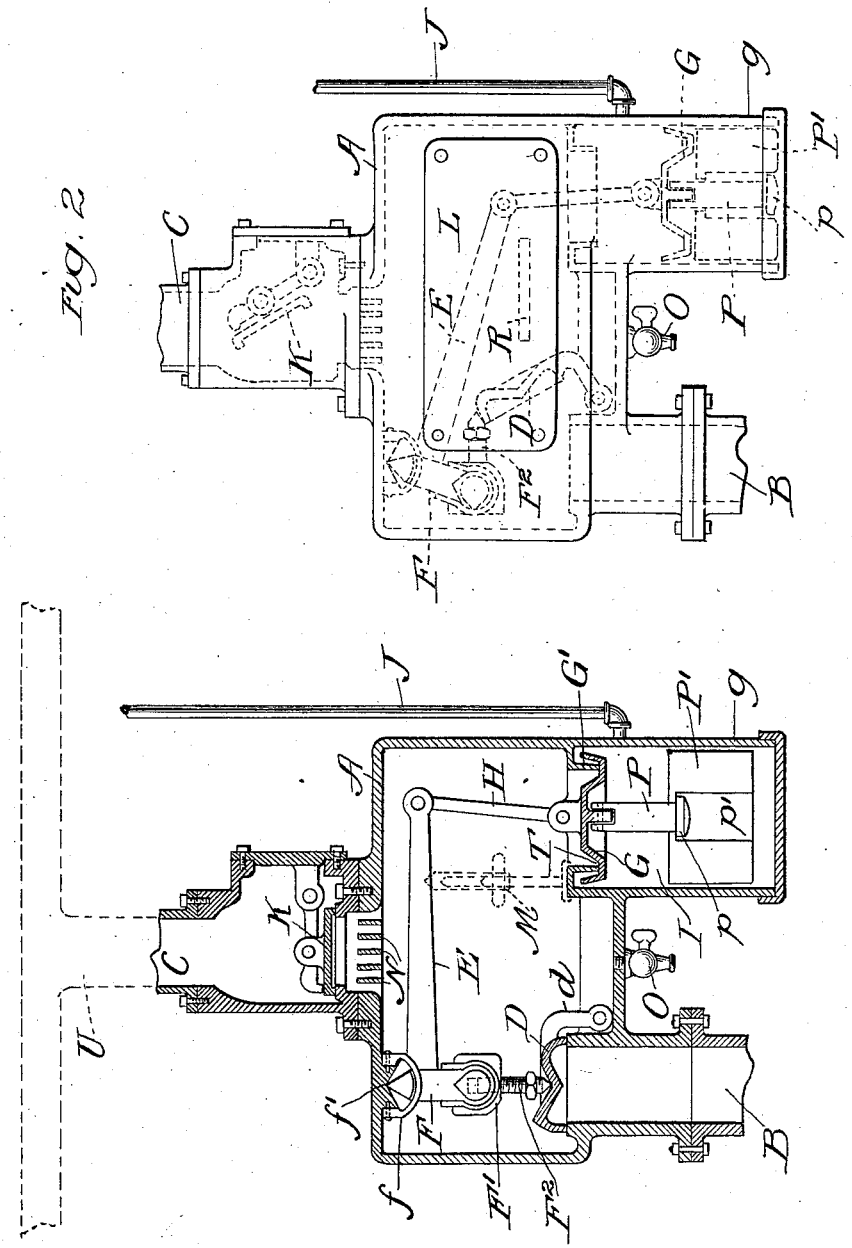

ALBERT BLAUVELT, OF CHICAGO, ILLINOIS.

FIRE-EXTINGUISHER VALVE.

940,953. Specification of Letters Patent. Patented Nov. 23, 1909.

Application filed May 2, 1902. Serial No. 105,697.

*To all whom it may concern:*

Be it known that I, ALBERT BLAUVELT, residing at Chicago, in the county of Cook and State of Illinois, have invented certain new and useful Improvements in Fire-Extinguisher Valves, of which the following is a specification.

My invention relates to automatic valves for controlling the water supply from a water main or other source of supply to the distributing pipes of sprinkler systems and the object thereof is to provide a valve of this character which is self contained, durable, easy of inspection adjustment and repair, less liable to false tripping, less liable to inoperativeness from water columning and less subject to corrosion than the present standard valves of this character.

My device is incapable of being affected by fluctuations of pressure in the supply and is incapable of misadjustment, provision being made for assuring the proper position or set of the valve mechanism.

Other advantages will be apparent from the description hereinafter given.

In the drawing, Figure 1 is a vertical sectional elevation of my valve device and of its immediate connections with the water supply and with the distributing pipes of a sprinkler system; and Fig. 2 an elevation of such device.

Before proceeding with a description of my invention, it is to be understood that my valve mechanism may be employed in connection with a wet pipe system as well as with a dry pipe system but for convenience I will describe the same as used in connection with a dry pipe system.

My device or mechanism comprises a casing A having an interior chamber communicating with the inlet water main B and also with the outlet or service pipe C which is in connection with the distributing pipes of the system. The water inlet B which may be referred to as "the supply" is, in the normal condition of the system, kept constantly filled by and is freely and permanently connected to a water supply from a street main or any substitute source of volume and pressure of fluid supply. In the dry pipe system, in connection with which my invention is now being described, the distributing pipes U, shown in dotted lines, communicate with the outlet or service pipe C and are filled with air at a greater pressure than the atmospheric pressure.

My valve mechanism is designed to be automatic in its workings and to be dependent for its operation upon the maintenance of the air pressure in the distributing pipes of the sprinkler system, and such mechanism comprises a valve D governing the water inlet B and having an arm $d$ pivoted within the casing. This valve is normally kept closed by means of a toggle arrangement consisting of an arm or member F and a second member or arm F' pivoted thereto, the latter arm or member being adjustable in length by reason of a screw $F^2$ forming its lower portion which coöperates directly with the valve D. The toggle arm F has connected to it, or as a part of it, an arm E which stands horizontally, as shown in Fig. 1, when the parts are in normal or set position ready for automatic operation in the well known way. The toggle member F is sustained or supported from the top of the casing by a bracket or support $f$ and its upper end is fulcrumed at $f'$ which is the apex of a conical recess or depression in such casing top. When the members of the toggle are in substantially a straight line, that is, in substantial alinement as shown in Fig. 1, the valve D is closed, the lower conical end of the screw $F^2$ bearing in a conical depression in the water valve D. The water is thus held from entering the valve casing and the sprinkler system as long as this alinement of the toggle is maintained.

The trip mechanism which is directly under the control of the pressure of the air of the sprinkler system comprises a preferably cup shaped trip valve G adapted to travel in a chamber I formed by a depending extension $g$ of the valve casing A, and weighted by the weights P, P', the weight P being pivoted to the trip valve and being loosely secured to the lower weight P' so that such lower weight is moved only when the trip valve is near its highest point. Hence when the trip valve is at such highest position, that is when it is seated, the combined force or gravity of both weights is exerted upon such valve until after a slight movement thereof the lower weight P' will rest upon the bottom of the chamber I and its force will be eliminated so that the trip valve will have only the weight P drawing it farther downward, said weight P telescoping within the weight P′ for this purpose. The lower weight P′ has a central opening p′ within which the other weight is movable but from which it cannot be withdrawn on account of the enlarged head p on the lower end of the weight P.

The trip valve G is connected to the toggle device, hereinbefore described, by means of a link H pivoted at its lower end to said valve and at its upper end to the arm E whereby the toggle will partake of the movements of the trip valve and be governed thereby. The trip valve chamber I has communication with the sprinkler system by means of the air supply pipe J so that chamber I contains the same pressure as the distributing pipes of the system with the result that so long as the proper predetermined pressure is maintained in such distributing pipes the trip valve is held upon its depending seat G′ by the pressure of such air and against the gravity of the weights P, P′. By preference the trip valve G is cup shaped or provided with a groove T adapted to retain grease or other fluid so as to form a seal at the valve seat.

The inlet or service pipe C is governed by a check valve K which has a pivoted or swing valve permitting free entrance or passage of water from the chamber of the valve casing A to the distributing pipes of the sprinkler system. The passage from the chamber of the valve casing is preferably provided with a strainer N to prevent passage of chips, stones, or the like. A drain cock O may be used to drain the casing A of water or moisture. In order to reset the trip valve and toggle arrangement to normal position shown in Fig. 1, I employ a screw jack M adapted to bear against the arm E and thereby restore these parts to normal or set position. This screw is removable and is therefore shown in dotted lines. To provide for access to the interior of the valve casing for the purpose of so resetting the valve or of the inspecting, repairing or adjusting of any of the parts, I provide a side opening closed by a removable cover L. By preference this cover has a lug or plate R preferably cast solid therewith and extending inwardly straight across the interior of the valve casing and having the twofold function of serving as a stop for the inlet valve D thereby preventing breakage or the bending of its hinges or pivots, and also as serving as a means of assuring that the parts occupy a set or normal position when the cover is put in place so that the valve mechanism would be allowed to automatically operate.

The normal adjustments or set of my dry valve is as shown in Fig. 1, the inlet valve D being held closed by the strut composed of the toggle which is kept in this set position by the link H which is itself held in set position by means of the air trip valve G sustained against gravity by the air of the sprinkler system forced against its under side through the pipe J.

Air is prevented from entering the valve casing A by the seating of the trip valve G and also by the check valve K, thus permitting the interior of such casing to be opened to the atmosphere at the small drain O, thereby causing the air of the sprinkler system to be a sustaining power effective upon the air trip valve to the full difference between the pressure in the distributing pipes and the atmospheric pressure.

When any one or more of the sprinkler heads are fired or when from any other cause the air in the distributing pipes becomes of too low a pressure to sustain the weight of the air trip valve, such valve will fall thereby canting the theretofore alined members of the toggle and relieving the inlet valve D sufficiently to permit the pressure of the water below to quickly open the inlet valve whose cup shaped upper surface forces the then loose lower member of the toggle to or beyond the approximate position of parts shown in dotted lines in Fig. 2. The water thus enters the valve casing, passes through the strainer and opens a check valve K whereby the distributing pipes of the sprinkler system are supplied with water. The position of the parts when the sprinkler system is operating is shown by the dotted lines in Fig. 2.

In Fig. 2 my dry valve is shown as in wet service, the supply of water being free to enter and fill all parts of the system and the dry valve performing no function other than that of a common check valve which function is always constant by reason of the outlet K whether as an air check in dry service or a fluid check in wet service. When my device is used in wet service I prefer to close the small drain O to avoid needless waste of the water supply.

For convenience in the illustration of my present invention I have omitted from the drawings all removable seats, bushings, packings and other non-essential devices such as are understood as preferable and desirable and are well known to those skilled in the art.

While I have described more or less precise forms and details of construction it is to be understood that I do not limit myself thereto but contemplate changes in the form, proportion and arrangement of parts as circumstances may require or render expedient without departing from the spirit and scope of my invention and claims, and furthermore I contemplate using my valve wherever the same is applicable.

I claim:

1. Automatic valve mechanism for sprinkler systems comprising a valve casing having communication with a water supply and with the sprinkler system, an inlet valve within the casing for governing said supply a valve governing the communication with the system, a toggle arranged within the casing but adapted when the toggle members are in alinement to hold said inlet valve closed, and an air trip valve independent of the aforesaid valves held in normal position by the pressure of the system and actuated by its gravity when such pressure is released; substantially as described.

2. In automatic valve mechanism for sprinkler systems, the combination with a suitable water inlet valve, and a valve governing communication with the system, of a toggle forming a straight strut when bearing upon the valve to close it, an operating arm positively connected to the toggle, and an air trip valve operatively connected to said arm independent of the aforesaid valves and held in normal position by the pressure of the system and actuated by its gravity when such pressure is released; substantially as described.

3. In automatic valve mechanism for sprinkler systems, the combination with a suitable water inlet valve, of a toggle forming a straight strut when bearing upon the valve to close it, an operating arm connected to the toggle, a trip-valve controlled by the air pressure of the system and a pivoted link between the trip-valve and said operating arm said link being pivoted to the trip valve and operating arm respectively; substantially as described.

4. A casing having a water inlet and a water outlet, a valve governing said inlet, a toggle bearing against the casing at one end and against the inlet valve at the other to hold it seated, and an air trip valve normally held seated against the force of gravity by the pressure of the system and positively connected with said toggle to flex the same when the pressure in the system is diminished and the valve falls.

5. A casing having a water inlet and a water outlet, a valve governing said inlet, a toggle comprising two members bearing against the casing at one end and against the inlet valve at the other to hold it seated, one of said toggle members having an arm rigidly secured thereto, and an air trip valve normally held seated against the force of gravity by the pressure of the system, and a link pivotally connected with said last mentioned valve and also pivotally connected with the arm upon the toggle, whereby said toggle is flexed when the pressure in the system is diminished and the valve falls.

6. The combination of the casing A, having the water inlet B and outlet C, a valve D governing said inlet and a valve K governing the outlet, a toggle comprising the members F and F', one bearing against the casing and the other against the valve, an arm E connected to member F, a link H pivoted to the arm E and an air trip valve G independent of the outlet valve and controlled by the pressure of the system and pivotally connected to the link H; substantially as described.

7. The combination of the casing A having the water inlet B and outlet C, a valve D govering said inlet and a valve K governing the outlet, a toggle comprising the members F and F', the member F being supported by a bracket which is secured to the top of the casing and the member F' being pivoted to member F and bearing against valve D, an arm E connected to member F and an air trip valve operatively connected to the arm E; substantially as described.

8. In a device of the class described, the combination of an air trip valve, two weights secured to such valve, both weights exerting their force when the valve is fully raised and seated and only one thereof when the valve is fully open; substantially as described.

9. In a device of the kind described, the combination of an air trip valve, two weights secured to the valve, one thereof having a partial movement independent of the other, whereby the combined force of both weights will be exerted when the valve is seated, but that of only one thereof when the valve is opened; substantially as described.

10. In a device of the class described, the combination of an air trip valve, two weights secured to the valve and telescoping in each other, the combined gravity being effective on the valve when seated but that of only one thereof when the valve is opened; substantially as described.

11. The combination of the casing A having the water inlet B and outlet C, a valve D governing the inlet, a check valve K at the outlet, mechanism for normally holding valve D closed, a weighted trip valve for governing said valve D independent of the valve K and held seated by the air pressure of the system against the force of gravity, and a strainer N below the check valve; substantially as described.

12. In a device of the class described, the combination of a casing A having communication with a sprinkler system, movable mechanism therein for the governing of said communications, said casing having an opening for inspection and resetting purposes, and a removable cover adapted to close said opening and having an inwardly extending lug R arranged to clear all such mechanism when set for operation, but to strike thereagainst and prevent closing of the casing whenever such mechanism is not properly set; substantially as described.

13. In a device of the class described, the combination with a casing having a water way including a low pressure chamber having an inlet opening thereinto and an outlet opening therefrom, of a valve for controlling said inlet, a valve for controlling said outlet, a toggle engaging the inlet valve at one end and at its other end engaging the casing, said toggle consisting of two members operatively related to each other, a pressure chamber at the side of the low pressure chamber having communication with the system, and a valve within said last mentioned chamber held seated against the force of gravity by the pressure within the chamber; substantially as described.

14. In a device of the class described the combination of a casing having a low pressure chamber, a chamber communicating with the distributing system, a check valve for controlling communication between said chambers, a valve for controlling the inlet to the low pressure chamber, a pressure chamber disposed at the side of the low pressure chamber and having communication at all times with the system, a valve for controlling communication between the chamber last aforesaid and the low pressure chamber, a toggle at one end engaging the inlet valve and at the other end engaging a fixed abutment, and means interposed between the said valve and the toggle, for holding the latter in place and comprising an arm rigidly connected with the toggle and a link between such arm and said valve, substantially as described.

15. In a device of the class described, the combination of a casing having a water way, a valve for controlling the inlet to the water way, a toggle within said water way engaging said inlet valve and having an arm or lever projecting from one of its members, a pressure chamber communicating directly with the water way and also with the system, a weighted valve within said chamber normally held seated against the force of gravity by the pressure in the chamber, and a link pivotally connected with said last mentioned valve and also pivotally connected with the arm upon the toggle; substantially as described.

16. In a device of the class described, the combination of a casing having a water way, a valve for controlling the inlet to the water way, a valve for controlling the outlet from said water way to the system, a pressure chamber located at the side of the water way and communicating directly therewith and also with the system, a valve controlling communication between the two chambers, and means interposed between the valve first aforesaid and the valve last aforesaid for holding the valve first aforesaid seated and comprising an arm rigidly connected with the toggle and a link between such arm and the valve which controls communication between said two chambers, substantially as described.

17. In a device of the class described, the combination of a casing having a water way, a valve for controlling the inlet to the water way, a toggle engaging said valve, a valve for controlling the outlet from said water way to the system, a pressure chamber located at one side of the water way and communicating therewith and also with the system, a valve for controlling communication between the two chambers, said valves being differential, and means interposed between the valve first aforesaid and the valve last aforesaid for holding the valve first aforesaid seated, and comprising an arm rigidly connected with the toggle and a link between such arm and the valve which controls communication between said two chambers, substantially as described.

18. In a device of the class described, the combination of a casing having a low pressure chamber, a valve for controlling the admission of water thereto, a toggle engaging said valve, a valve for controlling the outlet from said water way to the system, a pressure chamber located at the side of the low pressure chamber and constantly communicating therewith and with the distributing pipes of the system, a valve for controlling communication between the chambers, said valves being differential, and means interposed between the valve first aforesaid and the valve last aforesaid for holding the valve first aforesaid seated, and comprising an arm rigidly connected with the toggle and a link between such arm and the valve which controls communication between said two chambers, substantially as described.

ALBERT BLAUVELT.

Witnesses:
S. E. HIBBEN,
LOUIS B. ERWIN.